(12) United States Patent
Segawa et al.

(10) Patent No.: US 12,054,417 B2
(45) Date of Patent: Aug. 6, 2024

(54) BUSHING FOR PRODUCING GLASS FIBERS AND METHOD FOR PRODUCING GLASS FIBERS

(71) Applicant: TANAKA KIKINZOKU KOGYO K.K., Tokyo (JP)

(72) Inventors: Hideo Segawa, Isehara (JP); Jumpei Suzuki, Isehara (JP); Shigekazu Onozumi, Isehara (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 0 days.

(21) Appl. No.: 18/287,397

(22) PCT Filed: Mar. 10, 2022

(86) PCT No.: PCT/JP2022/010453
§ 371 (c)(1),
(2) Date: Oct. 18, 2023

(87) PCT Pub. No.: WO2022/224612
PCT Pub. Date: Oct. 27, 2022

(65) Prior Publication Data
US 2024/0083801 A1 Mar. 14, 2024

(30) Foreign Application Priority Data
Apr. 23, 2021 (JP) ................................. 2021-073632

(51) Int. Cl.
*C03B 37/095* (2006.01)
(52) U.S. Cl.
CPC ................................. *C03B 37/095* (2013.01)
(58) Field of Classification Search
None
See application file for complete search history.

(56) References Cited

U.S. PATENT DOCUMENTS 3,859,070 A * 1/1975 Slonaker ................. C23C 24/00
65/495
5,017,205 A 5/1991 Shioura et al.
(Continued)

FOREIGN PATENT DOCUMENTS

EP 0 381 179 A2 8/1990
JP S62-207737 A 9/1987
(Continued)

OTHER PUBLICATIONS

Taiwanese Patent Office, "Office Action with Search Report," issued in connection with Taiwanese Patent Application No. 111111621, dated Feb. 10, 2023.
(Continued)

*Primary Examiner* — Lisa L Herring
(74) *Attorney, Agent, or Firm* — Foley & Lardner LLP

(57) ABSTRACT

A bushing for producing glass fibers, including: a plurality of nozzles made of platinum or the like to discharge molten glass; and a base plate made of platinum or the like. A coating layer is preferentially formed on an outer circumferential face on a tip part on the side of glass discharge of the nozzle, and a width of the coating layer is 5% or more and 95% or less with respect to the entire length of the nozzle. The base plate includes a non-coating area. Areas of the nozzles and the base plate not provided with the coating layer act as a sacrificial metal for protecting the nozzle tip parts. In consideration of the sacrificial metal, a coverage rate P of the coating layer on the nozzle tip parts calculated with a prescribed equation is preferably 5% or more and 350% or less.

4 Claims, 5 Drawing Sheets

(56) References Cited

U.S. PATENT DOCUMENTS

2016/0332906 A1  11/2016  Osawa et al.
2021/0340053 A1  11/2021  Tada et al.

FOREIGN PATENT DOCUMENTS

| JP | H02-275729 A | 11/1990 |
|---|---|---|
| JP | H03-17295 A | 1/1991 |
| JP | 5792104 B2 | 10/2015 |
| JP | 5813145 B2 | 11/2015 |
| JP | 6624750 B1 | 12/2019 |
| JP | 2020-040850 A | 3/2020 |

OTHER PUBLICATIONS

Japanese Patent Office, "Decision to Grant a Patent," issued in connection with Japanese Patent Application No. 2021-073632, dated Jul. 19, 2022.

International Searching Authority, "International Search Report," issued in connection with International Patent Application No. PCT/JP2021/010453, dated May 17, 2022.

International Searching Authority, "Written Opinion," issued in connection with International Patent Application No. PCT/JP2021/010453, dated May 17, 2022.

\* cited by examiner

FIG. 5
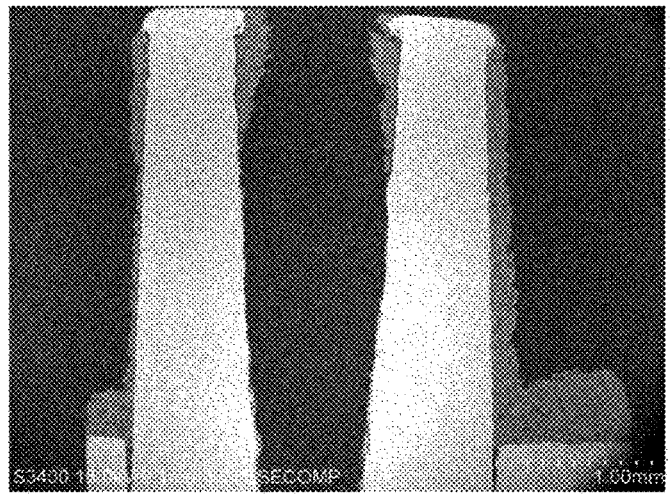
AFTER HEATING AT 1200°C FOR 1 MONTH
(THERMAL SPRAYING ON ENTIRE SURFACE)
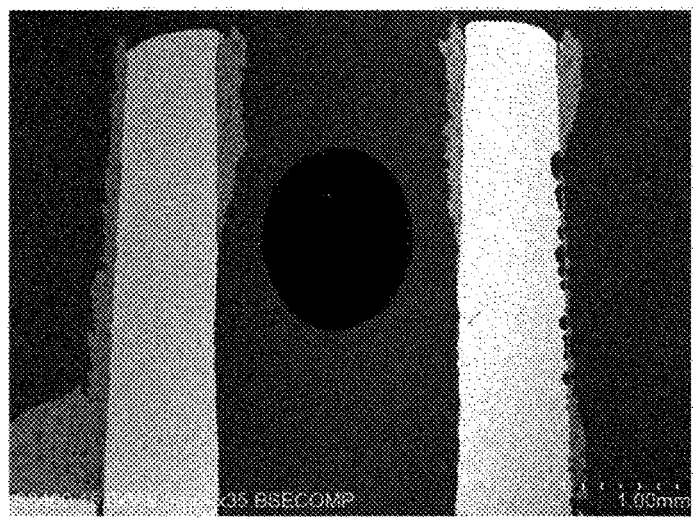
AFTER HEATING AT 1600°C FOR 1 MONTH
(THERMAL SPRAYING ON ENTIRE SURFACE)

FIG. 6
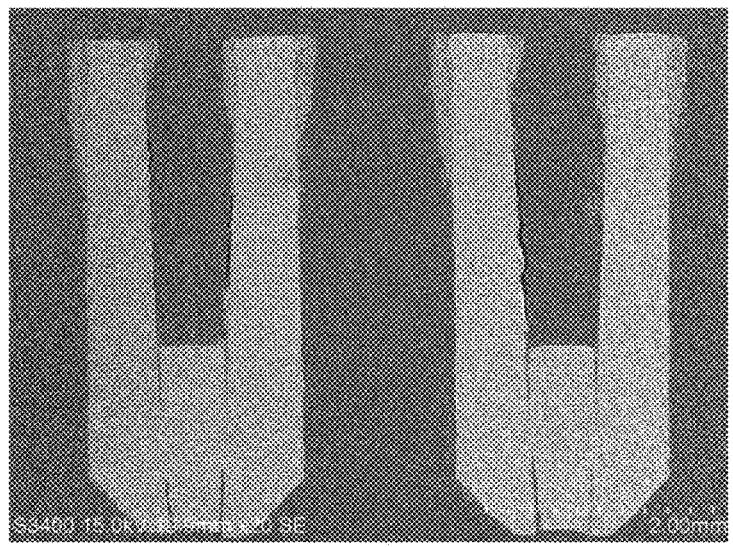
AFTER HEATING AT 1200°C FOR 1 MONTH
(COATED ONLY AT TIP)
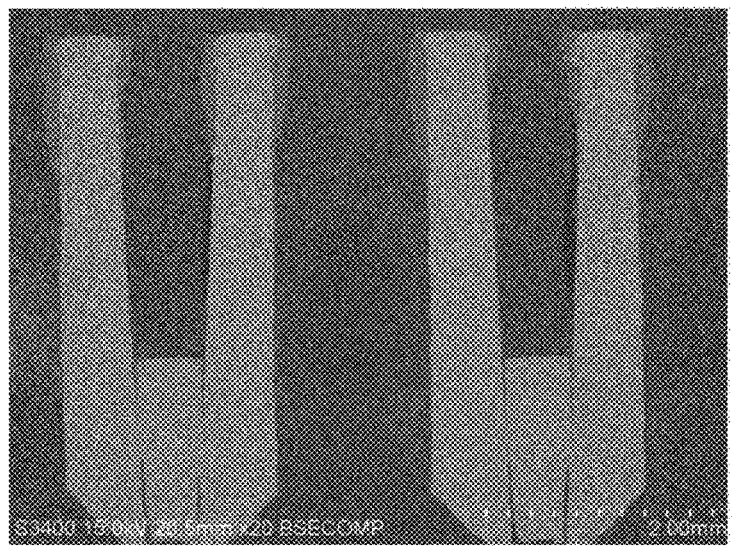
AFTER HEATING AT 1600°C FOR 1 MONTH
(COATED ONLY AT TIP)

BUSHING FOR PRODUCING GLASS FIBERS AND METHOD FOR PRODUCING GLASS FIBERS

CROSS-REFERENCE TO RELATED APPLICATIONS

The present application claims priority under 35 U.S.C. § 371 to International Patent Application No. PCT/JP2022/010453, filed Mar. 10, 2022, which claims priority to and the benefit of Japanese Patent Application No. 2021-073632, filed Apr. 23, 2021. The contents of these applications are hereby incorporated by reference in their entireties.

BACKGROUND OF THE INVENTION

Field of the Invention

The present invention relates to a bushing for producing glass fibers from molten glass. More particularly, it relates to a bushing for producing glass fibers capable of discharging a glass flow stably in long-term device operation to spin glass fibers.

Description of the Related Art

Glass fibers are produced by obtaining a glass basis material by refining and homogenizing molten glass obtained by heating a glass raw material at a high temperature, and supplying the glass basis material to a bushing. In a bushing for producing glass fibers, a large number of nozzles are aligned and attached on a bottom face of a base plate, and the glass basis material is discharged from these nozzles in a fibrous form. The glass basis material discharged from the nozzles is wound up while being cooled to provide glass fibers. The base plate and the nozzles of the bushing for producing glass are generally made of a platinum-based material such as platinum or a platinum alloy.

The glass basis material in a molten state has a high temperature of 1000° C. or more, and a speed of discharging the glass basis material from a nozzle may reach several thousand meters per min. Therefore, an environment around the bushing is considerably harsh. Besides, in glass fibers as a product, mixture of even a minimum amount of impurities is unacceptable. Therefore, to component members of the bushing, materials having high-temperature strength/high-temperature durability, and having stability for avoiding contamination of a glass basis material should be applied. Platinum corresponding to a principal component of a platinum-based material is good in high-temperature strength/high-temperature creep characteristics, and excellent also in chemical stability. A bushing made of a platinum-based material can spin glass fibers even under a high-temperature environment where molten glass is distributed.

It is not, however, that a platinum-based material excellent in strength at a high temperature and stability is not damaged during long-term operation of a device for producing glass. In manufacturing sites for glass fibers, deterioration in quality of glass fibers has been reported to occur when device operation time is long. The cause is damage of a nozzle arranged on a base plate. The nozzle damage is caused probably due to influence of a high-temperature/high-speed air flow generated around the bushing described above. It is conventionally known that volatilization loss is caused in platinum at a high temperature, and volatilization of platinum is accelerated in a part exposed to the high-temperature/high-speed air flow, resulting in causing abrasion of the nozzle.

A state of such nozzle abrasion varies depending on production conditions for glass fibers, and a cooling structure of the bushing. FIGS. 1(a) and 1(b) are a diagram illustrating an example of the state of the nozzle abrasion caused by an air flow. As illustrated in FIGS. 1(a) and 1(b), a whole or a part of the outer circumferential face in a tip part of a nozzle is abraded by the high-temperature/high-speed air flow, resulting in changing the cross-sectional shape of the nozzle into an inverted V shape (FIG. 1(a)) or a diagonally cut shape (FIG. 1(b)). When the nozzle is thus largely abraded, glass fibers cannot be spun as desired, and hence, the bushing reaches the end of life even if members except for the nozzle are sound.

There are some countermeasures against the above-described problem of the damage of a bushing for producing glass. For example, in order to protect nozzles from the air flow, a windshield wall is provided along an outermost nozzle row in a nozzle group aligned on a base plate (Patent Document 1). This countermeasure takes it into consideration that a part most largely affected by the air flow in the nozzle group is tip parts of nozzles of the outermost nozzle row in the nozzle group. For a similar reason, there is a bushing in which nozzles of an outermost row in a nozzle group are plugged in advance as dummy nozzles to make these function similarly to the windshield wall (Patent Document 2).

In addition to providing the member having the windshield effect as described above, means for preventing abrasion of a platinum-based material by forming a coating layer on a base plate and nozzles of a bushing has been proposed (Patent Documents 3 and 4). In these related arts, the base plate or nozzles, or the entire bushing is coated with heat resistant ceramic such as stabilized zirconia, and thus, the platinum-based material is blocked out from the external environment to suppress the abrasion.

PRIOR ART DOCUMENT

Patent Document

Patent Document 1: Japanese Patent No. 5813145
Patent Document 2: Japanese Patent No. 5792104
Patent Document 3: Japanese Patent No. 6624750
Patent Document 4: Japanese Patent Application Laid-Open No. 2020-040850

SUMMARY OF THE INVENTION

Technical Problem

Regarding the windshield wall described above as the countermeasure against the abrasion of the bushing, the weight of the bushing may be increased, and the windshield wall may change the air flow around the bushing to change the flow of molten glass discharged. On the other hand, the application of the dummy nozzles excessively increases the amount of a base metal of the platinum-based material because nozzles not contributing to glass fiber spinning are set, and in addition, cannot be optimum in some cases from the viewpoint of production efficiency of glass fibers. Besides, the dummy nozzles and the like cannot cover a very wide range of the influence of the air flow. On the contrary, the coating does not cause problems of the windshield wall and the dummy nozzles. In consideration of heat resistance and abrasion resistance of ceramic used in a coating layer, the bushing can be expected to be used until the coating layer disappears when the coating layer is uniformly formed on the entire bushing.

According to examination made by the present inventors, however, a nozzle is damaged even in a conventional bushing for producing glass fibers having a coating layer formed thereon. In particular, it has been confirmed that even when the coating layer is formed on the entire bushing (including the nozzles and the base plate), the nozzle abrasion is caused. The nozzle abrasion caused in the bushing having the coating layer formed thereon does not involve peeling and elimination of the coating layer, and cannot be obviously visually recognized from the appearance at the initial stage. As the operation time elapses, however, although the state of the coating layer does not largely change, abrasion or a through hole may be caused over an area from the tip part (glass discharging part) to the side of the nozzle in some cases. Such nozzle abrasion and through hole may be generated in a shorter period than expected. The abrasion and through hole caused in a nozzle disturbs the glass flow, which disrupts spinning of glass fibers, and reduces production efficiency.

The present invention was devised under this background, and an object of the present invention is to find a cause of the nozzle abrasion in a bushing for producing glass fibers, and to provide a bushing in which nozzle abrasion is minimally caused in a long-term operation.

Solution to Problem

In order to solve the above-described problem, the present inventors have first examined the cause of nozzle abrasion. FIG. 2 illustrates photographs of a nozzle tip part taken by using a nozzle of a usually used bushing for producing glass fibers as a sample, and after forming a ceramic coating layer on the entire outer circumferential face, and reproducing abrasion therein by exposing the resultant to air at 1600° C. or more for 1 month. As is understood from FIG. 2, locally abraded parts are formed on the outer circumferential face at the nozzle tips. In the coating layer covering the nozzle, a crack/hole is formed in a position corresponding to the hole. As described above, abrasion of a platinum-based material is caused by volatilization of a constituent metal such as platinum or rhodium. The volatilization of platinum or the like is caused when the platinum or the like is changed into an oxide having volatility at a high temperature due to an oxidizing atmosphere such as air. Based on the state of the abrasion illustrated in FIG. 2, it is presumed that the local abrasion in the nozzle is caused because a minute crack/hole is first generated in the coating layer, and thus a route for discharging a vapor of an oxide of platinum or the like is formed therefrom. The ceramic constituting the coating layer is a porous material, and includes fine voids. It is regarded that a crack in the coating layer is generated because the voids are linked to one another due to thermal fluctuation applied to the coating layer. Then, a base metal surface of the nozzle is oxidized by air passing through the coating layer, and the thus generated oxide is released from the coating layer, resulting in enlarging the hole. Although an air flow is not involved in the reproduction test of FIG. 2, a high-speed air flow is generated around the nozzle in an actual device for producing glass fibers. The high-speed air flow has an effect of accelerating material transfer involved in the above-described abrasion formation process (entry of air and discharge of the oxide), and hence, it is presumed that the hole is enlarged more rapidly.

As described above, it is presumed that the abrasion of the tip part and the side of the nozzle provided with the coating layer proceeds because of three factors that (1) a crack/hole is generated in the coating layer, (2) oxidation reaction of platinum proceeds collectively and at a high cycle rate because it is in a narrow space formed by the crack or the like, and (3) air is supplied and an oxide is discharged by the high-speed air flow in the vicinity of the nozzle tip. If even one of these factors can be eliminated, the abrasion of the tip part and the side of a nozzle can be probably suppressed.

Accordingly, the present inventors have decided to eliminate the factor (2). Specifically, in a structure of a bushing, a coating layer is selectively/preferentially formed on a tip part of a nozzle, and the coating layer is intentionally not formed in the other part, particularly a base plate, to expose a base metal of a platinum-based material. Then, the effectiveness of this measure has been confirmed to accomplish the present invention.

Specifically, the present invention is drawn to a bushing for producing glass fibers including: a plurality of nozzles made of platinum or a platinum alloy from which molten glass is discharged; and a base plate made of platinum or a platinum alloy, the plurality of nozzles being joined to the base plate, in which a coating layer is formed on an outer circumferential face of a tip part on the side of glass discharge of each of the plurality of nozzles, a width of the coating layer is 5% or more and 95% or less with respect to the entire length of the nozzle, and the base plate includes, in at least a part thereof, a non-coating area not provided with the coating layer.

Regarding the factors (1) to (3) of the nozzle abrasion described above, the factor (1) of the generation of a crack/hole in the coating layer and the factor (3) of the influence due to a high-speed air flow are difficult to eliminate. As for the factor (1), as means for suppressing the generation of a crack or the like in the coating layer, a coating layer having uniform thickness/density can be formed evenly without gaps. It is, however, difficult to form such a coating layer on a bushing and all nozzles. The present inventors have presumed that when a coating layer is formed on a bushing and all nozzles, the nozzles may be locally abraded due to occurrence of unevenness or the like. Besides, the high-speed air flow in the vicinity of a nozzle tip of the factor (3) is an environmental factor caused in the production of glass fibers. It cannot be an essential solution to change production conditions for glass fibers for avoiding the high-speed air flow.

On the contrary, the factor (2) can be eliminated by causing oxidation reaction of platinum to preferentially proceed in an area except for nozzles. The oxidation/volatilization reaction of platinum or the like is suppressed from proceeding by increase of a volatilized product in the atmosphere. When platinum or the like is oxidized/volatilized in the area except for nozzles, a reaction preferentially occurring in the tip part or the side of a nozzle is suppressed.

For oxidizing/volatilizing platinum in the area except for the nozzles, it is considered effective that a coating layer is intentionally not formed on the base plate but a base metal of the platinum-based material is exposed in a part or the whole of the base plate. This means that an area of the base plate not coated is used as what is called a sacrificial metal (sacrificial material) to intentionally oxidize/volatilize this area. The base plate has a large area as compared with the area of each nozzle, and a volatilized product can be supplied around the nozzle through the oxidation/volatilization thereof. Thus, it can be expected that a volatilization suppressing effect can be imparted to all the nozzles.

On the other hand, in the present invention, the outer circumferential face of the nozzle tip part needs to have the coating layer. As described above, the coating layer itself does not cause the abrasion to proceed. As is understood from FIG. 2, since the base metal surface of the nozzle is not abraded in a part where a hole has not been generated, it is deemed that the coating layer has a protection effect. The side of the nozzle, particularly, the tip part thereof is a part more largely affected by the high-speed air flow than the base plate. In order to reduce the influence of the high-speed air flow as much as possible, the nozzle tip needs to have the coating layer.

As described so far, in the bushing for producing glass fibers of the present invention, although the coating layer is applied, a part where the coating layer is intentionally formed is limited to the outer circumferential face at the nozzle tip. The whole or a part of the base plate is opened, so that the platinum-based material can be exposed. Now, the structure of the busing for producing glass fibers of the present invention will be described in more detail.

(I) Base Plate

The base plate is a member for retaining a glass basis material in a molten state, and has a plate shape, or a box shape by bending. A material for the base plate is platinum or a platinum alloy, and a dispersion strengthened platinum alloy or a dispersion strengthened platinum-rhodium alloy is preferably applied for the purpose of improving the strength, in addition to platinum or a platinum-rhodium alloy (rhodium concentration: 5 to 20% by weight). The base plate is provided with through holes at connection positions with nozzles.

In the present invention, the base plate has a function as the sacrificial metal for suppressing the abrasion of the nozzle side and tip parts in addition to the function of holding the glass basis material described above. The dimension and the shape of the base plate need not be, however, particularly changed, and can be the same as those of a conventional base plate. In a base plate including a non-coating area not provided with the coating layer, even when platinum or the like is volatilized, abrasion caused thereby is mild and is not local. Any base plate produced under design conditions (such as a use temperature, and the volume of a glass basis material to be held) the same as those for conventional ones can be used while functioning as a sacrificial metal.

In the present invention, although a sacrificial metal for protecting the nozzle from abrasion is required, an auxiliary member serving as the sacrificial metal is not provided separately from the base plate, the nozzle and the like. In the environment around the bushing where a high-temperature and high-speed air flow is present, if the sacrificial metal is provided as a separate member, disturbance of the air flow or an abnormal temperature distribution are caused, which can possibly disrupt stable spinning of glass fibers to harmfully affect productivity. Besides, addition of a separate member increases the weight of the bushing. In addition, even if an auxiliary member serving as a sacrificial metal is used in the environment around the bushing, it is difficult to cause the auxiliary member alone to act as the sacrificial metal. For these reasons, the present inventors have presumed it optimum to cause the base plate to act as the sacrificial metal, and hence the above-described configuration is employed.

(II) Nozzle

Also to the nozzle, a nozzle used in a conventional bushing for producing glass fibers is basically applied. A plurality of nozzles is aligned and joined to a bottom face of a base plate. The shape (the outer shape and hole shape) of the nozzle is not particularly limited. The nozzle may be a straight tube nozzle or a tapered tubular nozzle, or a flat nozzle for use in production of flat fibers. Further, platinum or the above-described platinum alloy is applied also as a material for the nozzle.

In the bushing for producing glass fibers of the present invention, the number of nozzles to be arranged is not particularly limited, but many of bushings are usually provided with 200 to 10000 nozzles. Besides, the arrangement of nozzles is similar to the conventional one. As the arrangement of nozzles, nozzle groups in each of which nozzles are arranged at regular intervals may be arranged in multiple island shapes, or may be comparatively randomly arranged.

(III) Coating Layer on Nozzle Tip Part and Non-coating Area in Base Plate (III-1) Coating Layer on Nozzle Tip Part In the present invention, in the plural nozzles arranged on the base plate, the coating layer is preferentially formed on the outer circumferential face of the tip part on the side of glass discharge. The reason is that this part is particularly affected by the high-speed air flow in the bushing for producing glass fibers. Another reason is that it is particularly significant to protect the nozzle tip for continuing stable spinning of glass fibers. In the present invention, the base plate corresponding to the sacrificial metal is mainly affected by volatilization of platinum or the like, and therefore, even if the coating layer has a crack or the like, local abrasion therein is suppressed. In consideration of the influence of the high-speed air flow and the significance of protection of the nozzle tip, however, the coating layer is essential for the nozzle tip.

FIG. 3 illustrates an example of a nozzle having the coating layer formed thereon in the bushing of the present invention. A coating area where the coating layer is formed is the outer circumferential face of the tip part of the nozzle on the side of glass discharge. The coating layer is not formed on an end face of the nozzle. If the coating layer is present on the end face of the nozzle, it is concerned that wetting and spreading of the molten glass on the coating layer or turbulence of a molten glass flow may be caused. The coating layer is formed in a belt shape on the nozzle outer circumferential face, and the width of the coating layer is 5% or more and 95% or less with respect to the entire length of the nozzle. This is determined in consideration of a range of the influence of the high-speed air flow, and when the width of the coating layer is as small as less than 5% with respect to the entire length of the nozzle, the protection of the nozzle tip is insufficient. On the other hand, a base side of the nozzle is minimally affected by the high-speed air flow, and hence an excessively wide coating layer is not necessary. Besides, when a non-coating area is set on the base side of the nozzle, this area can be caused to act as the sacrificial metal together with the non-coating area of the base plate. The non-coating area of the nozzle is close to the coating area at the nozzle tip, and hence can exhibit an effective sacrificial metal effect. For these reasons, it has been decided that the coating layer is not formed in an area exceeding 95% of the entire length of the nozzle. Even when the base side of the nozzle acts as the sacrificial metal, the spinning of glass fibers is not affected unless the abrasion due to volatilization of platinum or the like is locally caused. The width of the coating layer with respect to the entire length of the nozzle is preferably 6% or more and 80% or less, and more preferably 8% or more and 70% or less.

The width of the coating layer on the nozzle tip part refers to a vertical length between the ends of the coating layer (shown as W in FIG. 3). Besides, the entire length of the nozzle refers to a vertical length from a joint part between the nozzle and the base plate to the nozzle tip part on the side of glass discharge (shown as h in FIG. 3). The coating layer is formed on all the plural nozzles arranged on the base plate. In addition, the width of the coating layer may fall in the above-described range at the tips of all the nozzles. Besides, in the nozzle, the coating layer is not formed in a part except for the area where the coating layer is formed in the above-described width (a base part of the nozzle). A specific dimension value of the width (W) of the coating layer of the nozzle is preferably 5 mm or less from the tip of the nozzle. It is preferable that the non-coating area of the nozzle is formed adjacently to the coating layer having the width of 5 mm or less at the nozzle tip so that the basis material of the platinum-based material acting as the sacrificial metal can be present.

(III-2) Non-Coating Area in Base Plate

In the present invention, the coating layer is formed on the outer circumferential face of the nozzle tip part, and the base plate includes, in at least a part thereof, a non-coating area not provided with the coating layer. In the base plate, no coating layer is formed on the entire surface thereof in some cases, and the coating layer is partially formed in other cases. What is important in the problem of the present invention is that the base plate excluding the tip parts of the nozzles supplies the sacrificial metal necessary for protecting the nozzle tip parts, and the coating layer may be present on the base plate as long as this action can be caused.

FIGS. 4(A) and 4(B) illustrate examples of an embodiment of the non-coating area of the base plate. As illustrated in FIG. 4(A), a surrounding area around a nozzle group may be used as the non-coating area, with the coating layer formed in the remaining peripheral area of the base plate. The width of the coating layer in this case is not particularly limited, and the coating layer may be formed on either one of the short sides or the long sides of the base plate. Alternatively, as illustrated in FIG. 4(B), a surrounding area around a nozzle row may be used as the non-coating area, with the coating layer formed in the other area. In either of these examples, the non-coating area is set in the vicinity of the nozzle. This is because the nozzle tip is suitably protected by using, as the sacrificial metal, the basis material of the platinum-based material of the base plate in the vicinity of the nozzle. The shape of the non-coating area is, however, not particularly limited. A surface area of the coating layer thus formed on the base plate will be described below.

(III-3) Surface Area of Coating Layer in Bushing of Invention

As described above, in the present invention, the basis material of the platinum-based material except for the nozzle tip part, and the basis material of the platinum-based material of the base plate not coated are used as the sacrificial metal, and thus, the tips of the nozzles having the coating layer formed thereon are protected. Therefore, the basis material of the platinum-based material not provided with the coating layer is preferably within a prescribed range for this purpose. Specifically, a coverage rate P in the nozzle tip parts represented by the following equation is preferably 5% or more and 350% or less:

$$P(\%) = C/(NC_1 + NC_2) \times 100 \quad \text{[Expression 1]}$$

In the equation, C is a total surface area of the coating layer formed on the nozzle tip parts of all the nozzles. In other words, it is a total surface area obtained by multiplying the surface area of the coating layer (width: 5% or more and 95% or less) formed on each nozzle by the number of nozzles. $NC_1$ is a total surface area of areas not provided with the coating layer on all the nozzles. In other words, it is a total surface area of the areas obtained by multiplying the surface area not provided with the coating layer by the number of nozzles. $NC_2$ is a surface area of the non-coating area set in the base plate. When the base plate has a plurality of non-coating areas, it is a total surface area of these.

The coverage rate P in the nozzle tip parts is set to 350% or less for supplying the sacrificial metal necessary for protecting the area at the nozzle tip provided with the coating layer. On the other hand, even when the surface area of the area not provided with the coating layer and acting as the sacrificial metal is excessive, the protection effect does not differ, and hence the coverage rate of 5% or more is determined suitable. The coverage rate P in the nozzle tip parts is more preferably 5% or more and 300% or less, and further preferably 5% or more and 250% or less.

Even when the coating layer is formed on the base plate, the surface area thereof is not used in the calculation of the coverage rate P in the nozzle tip parts. This is because the high-speed air flow considered in the present invention less affects the base plate than the nozzle tip parts, and the sacrificial metal effect by the basis material of the platinum-based material probably less acts. A non-coating area of the base plate can be, however, a supply source of the sacrificial metal to the nozzle tip parts, and therefore, the coating layer should not be positively excessively formed. The surface area of the coating layer formed on the base plate should be determined in consideration of the number (surface area) of nozzles to be protected and the like, and can be appropriately set to, for example, 70% or less, 55% or less, or 40% or less with respect to the surface area of the base plate. The remaining area on the base plate surface is the basis material of the platinum-based material. The surface area of the base plate herein means a surface area on the face on which the nozzles are joined, and does not include the area of the other face. Besides, the area of parts where the nozzles are joined (the cross-sectional areas of the nozzles×the number of the nozzles) is excluded as the surface area of the base plate.

The coverage rate P of the coating layer on the nozzle tip parts may be slightly changed through the operation of the busing (device for producing glass). This is probably because of change in the area of the coating layer due to abrasion caused around the busing by the high-speed air flow or a small amount of peeling/dropping of the coating layer, and dimensional change of the non-coating area in the nozzles and the base plate. The above-described coverage rate P of the coating layer means a numerical value obtained at the time of the production (at the start of use). As for variation in the coverage rate P through use of the bushing, variation of about 40% to 80% is allowable. For example, when the coverage rate P of the coating layer on the nozzle tip parts at the time of the production (at the start of use) is 60%, the coverage rate P after the use can be 24% to 48%.

A material for the coating layer is preferably at least any one of zirconia, stabilized zirconia, alumina, silica, aluminosilicate, and magnesia. Suppression of volatilization of platinum or the like under high-temperature heating and protection against abrasion due to a high-temperature high-speed air flow are taken into consideration. In particular, a coating material including stabilized zirconia is useful because it has a thermal expansion coefficient close to that of platinum, and is excellent in high-temperature durability. A thickness of the coating layer is preferably within a range of 2 μm or more and 500 μm or less. If the coating layer is extremely thin, the protection effect for the nozzle tip parts cannot be expected. If the coating layer is extremely thick, the coating layer may peel off due to small deformation of the nozzle or impact. The coating layer can be a single layer, or a plurality of layers. For example, an alumina coating layer may be formed on the nozzle surface, with stabilized zirconia coating layer formed thereon. The thickness of the coating layer needs not be uniform, and may be varied depending on a part to be coated as long as the thickness falls in the above-described range.

A method for forming the coating layer is not particularly limited, and examples include not only various thermal spraying methods (such as atmospheric plasma spraying method (APS), and suspension plasma spraying method (SPS)), aerosol gas deposition method (AD), and sol-gel method but also physical vapor deposition method (PVD), chemical vapor deposition method (CVD), cold spraying method (CS), plating method, and ion plating method.

In these methods for forming a coating layer, the thickness of the coating layer can be adjusted. For example, a coating layer with a thickness of about 2 to 10 μm can be formed by AD method, a coating layer with a thickness of about 50 to 150 μm can be formed by SPS method, and a coating layer with a thickness of about 50 to 500 μm can be formed by APS method. Besides, ceramic layers (coating layers) formed by these forming methods are different also in density. For example, a coating layer formed by AD method is a dense ceramic layer even when the thickness is small, and exhibits volatilization suppressing effect. In the present invention, the forming method and the thickness of the coating layer can be appropriately adjusted in accordance with the dimension and the shape of the nozzle, and use environment.

(IV) Other Configuration

The bushing for producing glass fibers of the present invention has a basic configuration of a combination of the base plate and the plurality of nozzles provided with the coating layer at the tips described above. An additional member may be further added. For example, a windshield wall or a plugged dummy nozzle described with reference to the related art may be arranged. This is because these are somewhat effective for the protection of the nozzle tips. In this case, the coating layer may be or may not be formed on the windshield wall or the dummy nozzle. In the present invention, it does not matter whether or not the coating layer is provided on the windshield wall or the like, and even when the coating layer is provided thereon, it is not considered in the calculation of the coverage rate P.

Advantageous Effects of Invention

As described above, in a bushing for producing glass fibers of the present invention, a coating layer is preferentially and essentially formed on an outer circumferential face on the side of a nozzle tip, and a platinum-based material is exposed in the other part. As a result, volatilization of platinum or the like is caused in an area not provided with the coating layer, and thus, abrasion at the nozzle tip is suppressed. According to the present invention, while turbulence of a glass flow due to nozzle abrasion is being suppressed in a step of spinning glass fibers, a device can be operated for a long period of time.

The bushing for producing glass fibers of the present invention is applicable to glass fiber production process by any method. Examples of the glass fiber production process include direct melt method in which a glass basis material in a molten state prepared to have a desired composition in a melting furnace is introduced into a forehearth and transferred to a bushing to be directly spun (DM method), and a marble melt method in which a glass basis material in a molten state is formed into a marble or rod having a prescribed diameter, and the resultant is molten again to be spun (MM method). Another example includes a stable method in which glass molten and discharged from a bushing is blown off with an injection device to form short fibers. In these production processes, glass fibers for various uses are produced at various temperatures and the like, and the bushing for producing glass fibers of the present invention can be used in any of the processes.

BRIEF DESCRIPTION OF THE DRAWINGS

FIG. 5 illustrates photographs of results of a heating test performed, as a preliminary test of a present embodiment, at 1200° C. or 1600° C. on a sample in which a coating layer is formed on the entire surface of a nozzle; and FIG. 6 illustrates photographs of results of a heating test performed, as a preliminary test of the present embodiment, at 1200° C. or 1600° C. on a sample in which a coating layer is selectively formed at a nozzle tip.

DETAILED DESCRIPTION OF THE PREFERRED EMBODIMENTS

Now, an embodiment of the present invention will be described. In the present embodiment, a preliminary test for confirming effectiveness of forming a coating layer on an outer circumferential face in a nozzle tip part was performed. Then, a bushing for producing glass fibers provided with a coating layer formed on a nozzle tip part was actually produced to spin glass fibers.

[Preliminary Test]

In the preliminary test, a sample simulating a product of a bushing was produced, and various coating layers were formed thereon to be subjected to a heating test. A sample was prepared by placing one platinum nozzle (tapered cylindrical body having an outer diameter (outer diameter at the upper end) of 2.70 mm×1.55 mm (outer diameter at the lower end), a thickness of 0.3 mm, and an entire length of 3.5 mm) used in an actual bushing for producing glass fibers on a plate (dimension: 15 mm×30 mm, thickness: 1.5 mm) of a platinum alloy (Pt-10 wt % Rh) simulating a base plate. Regarding this sample, two types of samples, that is, a sample 1 in which a coating layer was formed on the entire surface of the nozzle (on the entire surface on the side of the nozzle and the entire surface of the platinum plate), and a sample 2 in which a coating layer with a width of 1.75 mm (50% of the entire length of the nozzle) was formed at the nozzle tip, were produced. The coating layer was made of stabilized zirconia, and was formed by atmospheric plasma spraying method (APS) in a thickness of 150 μm. Then, these samples 1 and 2 were subjected to a heating test performed in air under two heating conditions of 1200° C.

for 1 month and 1600° C. for 1 month, so as to confirm whether or not local abrasion was caused at the nozzle tip.

Figure 1:
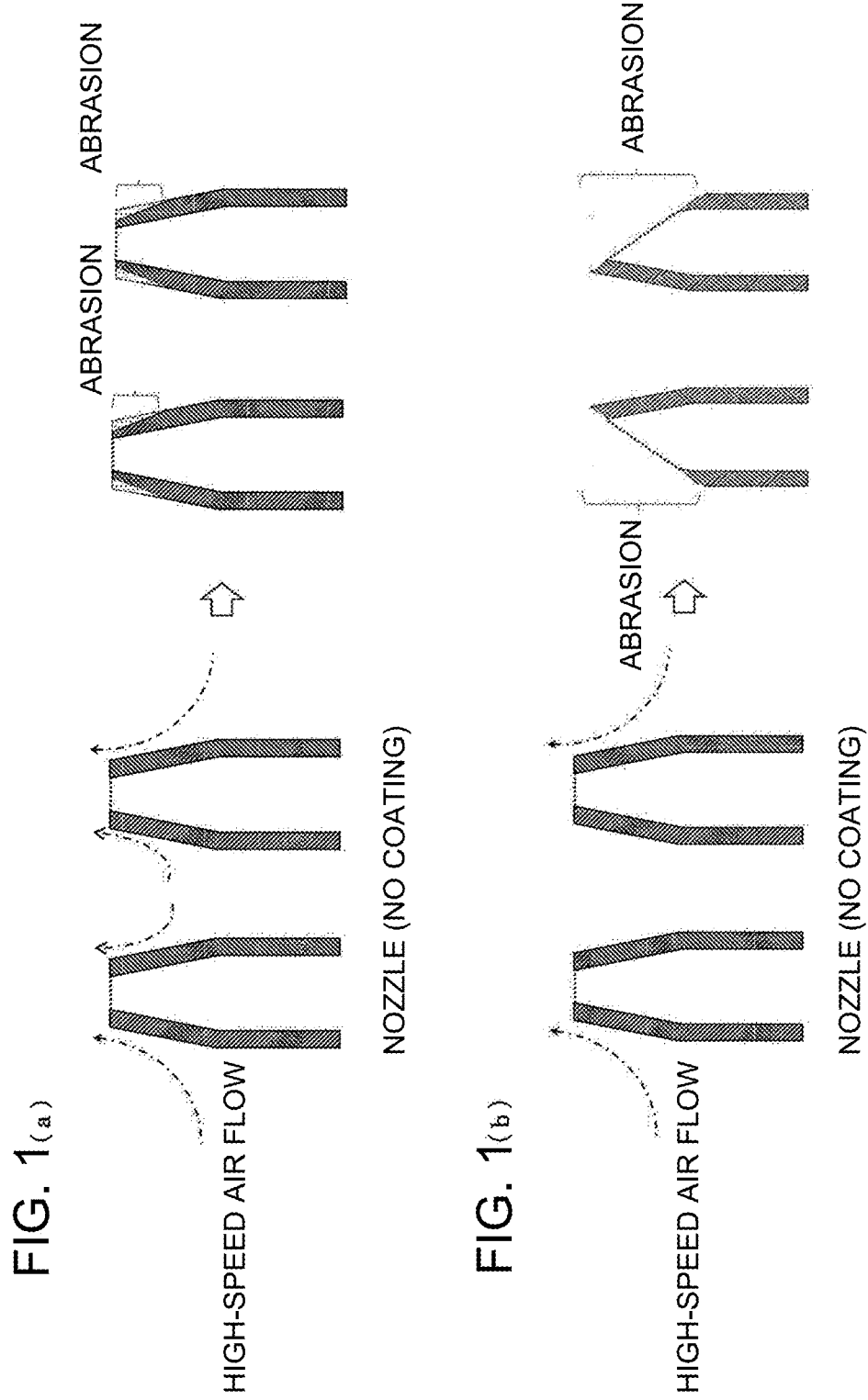
FIGS. 1(a) and 1(b) are a diagram illustrating an example of a state of nozzle abrasion caused in a conventional bushing for producing glass not provided with a coating layer.
Figure 2:
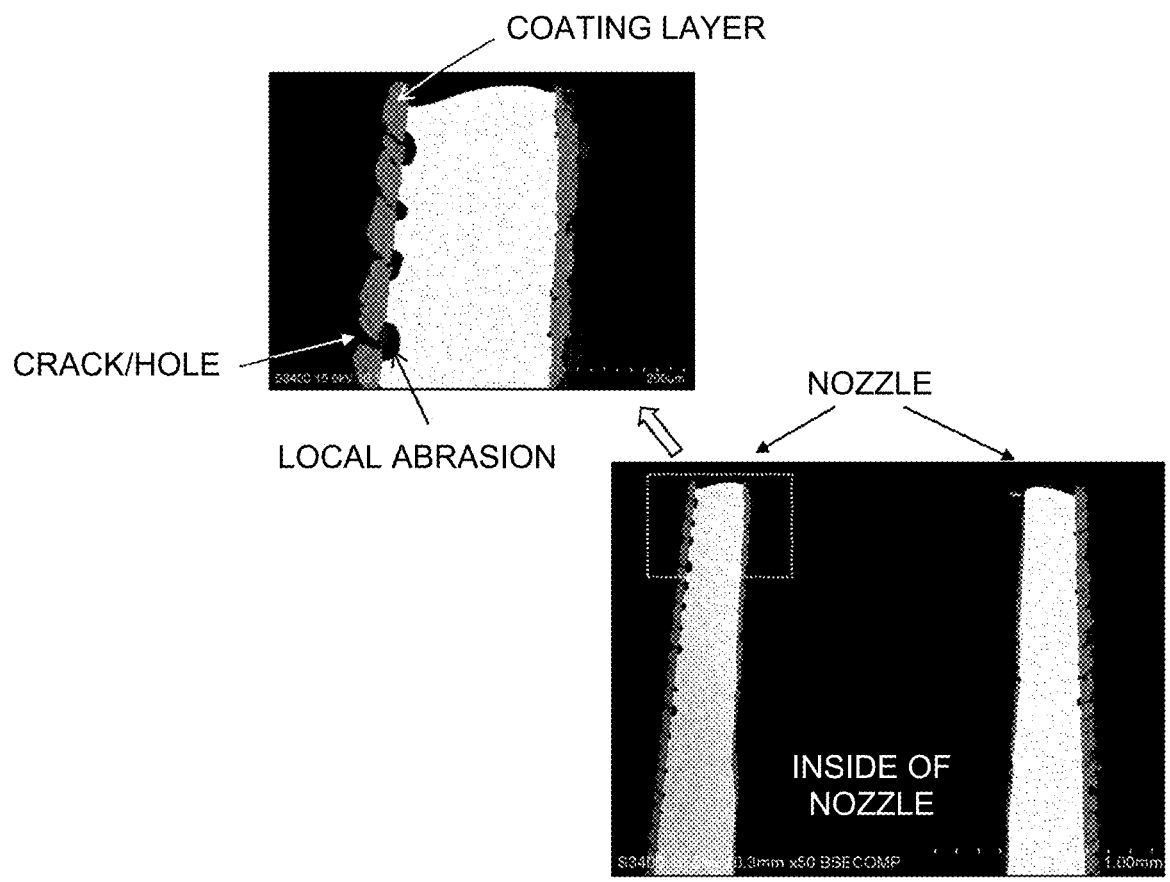
FIG. 2 illustrates photographs of examples of local abrasion caused in a nozzle tip part of a bushing for producing glass fibers coated on the entire surface.
Figure 3:
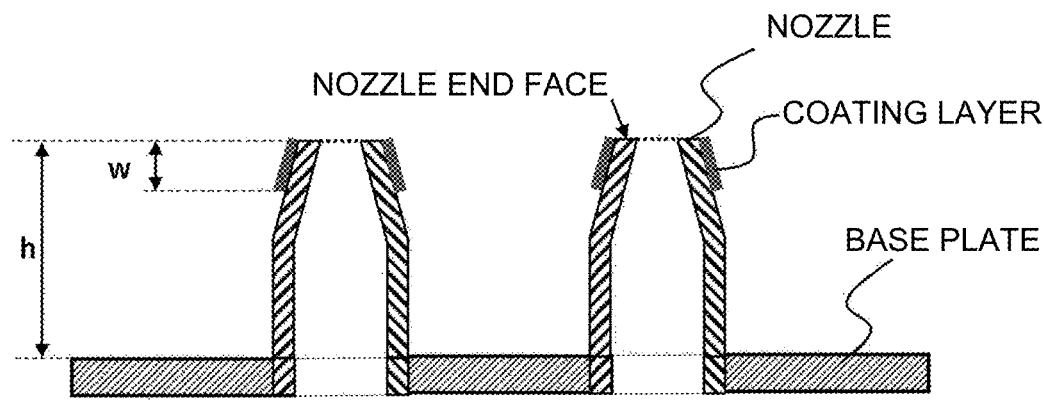
FIG. 3 is a diagram illustrating an example of an embodiment of a coating layer at a nozzle tip.
Figure 4:
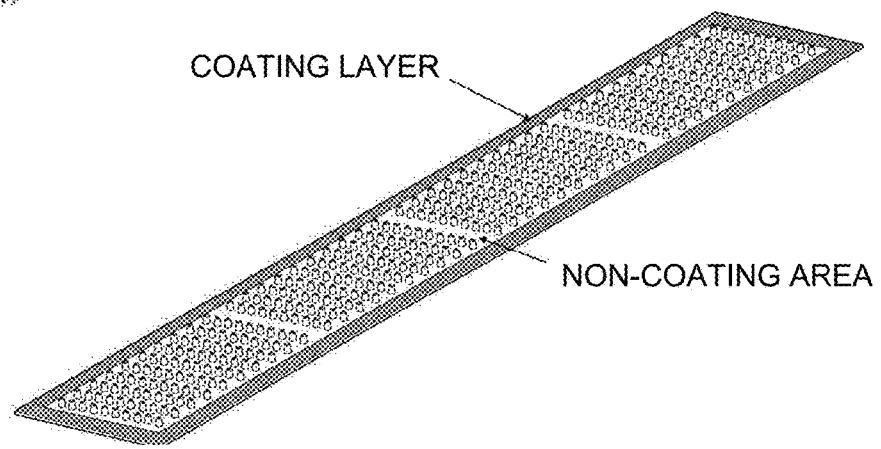
FIGS. 4(A) and 4(B) are a diagram illustrating specific examples of an embodiment where a coating layer is formed on a base plate in a bushing of the present invention.
Figure 4:
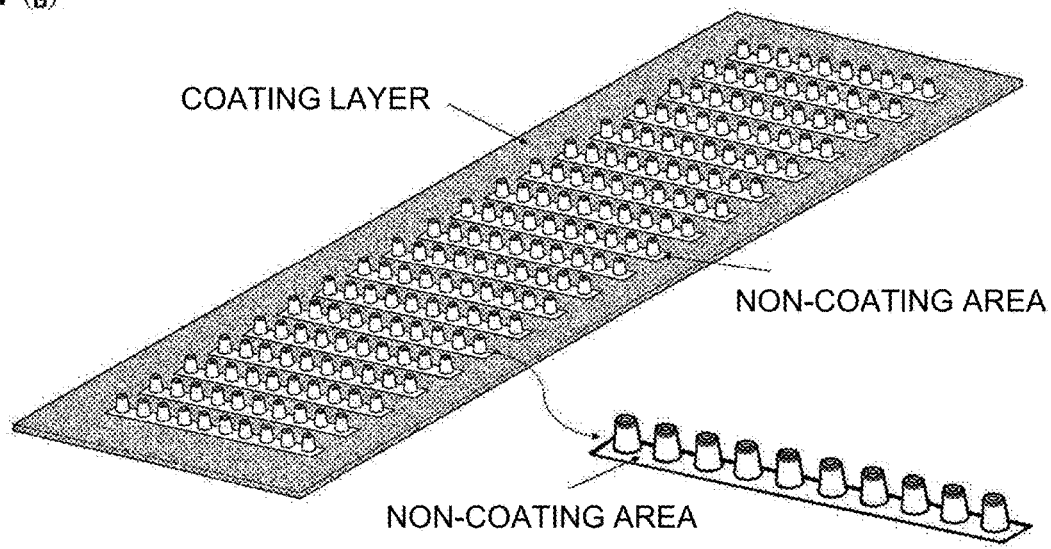

In this preliminary test, a photograph of the nozzle of the sample 1 coated on the entire surface taken after the heating test at 1200° C. is illustrated in FIG. 5, and a photograph of the nozzle of the sample 2 taken after the heating test at 1600° C. is illustrated in FIG. 2 described above. In the sample 1 in which the entire surface of the bushing was coated, local abrasion was not largely caused through heating at 1200° C. In the sample 2 in which the entire surface was coated, however, local abrasion was caused in a plurality of parts through heating at 1600° C.

On the contrary, results of the heating test (heated at 1200° C. and heated at 1600° C.) performed on the sample 2 in which the nozzle tip part was coated are illustrated in FIG. 6. In the sample 2 in which the nozzle tip part was coated, local abrasion was not caused at all through heating at 1200° C. In addition, also in the sample after the heating test at 1600° C., local abrasion was not caused in the same manner as in that after the heating test at 1200° C.

Based on the results of the preliminary test, it was confirmed that the selective coating layer formed on the outer circumferential face in the nozzle tip part was effective. In the sample 1 where the coating layer was formed on the entire surface of the nozzle, local abrasion was not largely caused through heating at 1200° C., but it is presumed that abrasion would proceed when the heating time is longer.

[Experimental Production/Field Test of Bushing for Producing Glass Fibers]

As described above, it was confirmed that the effect of suppressing local abrasion due to volatilization of platinum or the like can be obtained by forming the coating layer preferentially on the outer circumferential face of the nozzle tip part. Therefore, an actual bushing for producing glass fibers was experimentally produced to perform a field test for producing glass fibers. In the bushing for producing glass fibers experimentally produced in the present embodiment, 4000 nozzles made of a platinum alloy (Pt-20% Rh) having the same dimension as that used in the preliminary test were joined to a base plate made of a platinum alloy (Pt-20% Rh) having a bottom dimension of 155 mm×550 mm, and a thickness of 1.5 mm.

In this bushing for producing glass fibers, a coating layer made of stabilized zirconia was formed on the outer circumferential faces of the tip parts of all the nozzles. Specifically, the coating layer was formed in a width of 1.75 mm from the end of the nozzle on the side of glass discharge (1.75 mm from the nozzle base). The width of the coating layer corresponds to 50% of the entire length of the nozzle. In the other part of the nozzle and the base plate, the base metal (platinum alloy) was exposed. The coating layer had a thickness in a range of 50 µm to 300 µm in any part. The coverage rate P in the nozzle tip parts of this busing for producing glass fibers was 40.2%.

For producing this bushing for producing glass fibers, nozzles processed to the above dimensions by boring were aligned and joined to the base plate. In the joining of the nozzles, through holes were formed in nozzle attaching positions on the base plate in advance, and the nozzles were respectively inserted into the through holes, and then heating was performed to preliminarily join the nozzles in an electric furnace, and further, the bases of joint parts were welded with a YAG laser beam. In this manner, a bushing before coating was produced. Then, prior to formation of the coating layer, an area corresponding to a non-coating area was masked, and the coating layer was selectively formed on the outer circumferential faces at the nozzle tips. After forming the coating layer, the masking was removed to obtain a bushing for producing glass fibers of the present embodiment.

In a test for producing glass fibers using the bushing for producing glass fibers of the present embodiment, a terminal for electric heating and a box-shaped side flange were joined to the above-described bushing. The resultant bushing was assembled on the downstream side of a melting tank of a device for producing glass. The glass fibers discharged from the bushing were appropriately wound up.

Production of glass fibers was performed for 6 months with the device for producing glass provided with the bushing for producing glass fibers experimentally produced in the present embodiment (heating temperature in the bushing: 1300° C.). During this period, remarkable abnormality was not observed in the appearance of the nozzles of the bushing. The spinning of glass fibers could be stably performed. After the operation for half a year, the device for producing glass was once shut down, the bushing was taken out, and the base plate and the nozzles were inspected.

As a result of the inspection, local abrasion such as a hole was not observed in any nozzles. On the other hand, when the base plate was observed to check the abrasion amount, although abrasion in thickness of the base plate was liable to be large in a part from the center toward the both ends, remarkable abrasion was not caused as a whole. As a result of measurement, although there was a part abraded by about 7% with respect to the thickness at the time of production, the thickness abrasion was roughly about 1.7%. In the device operation during this half year period, abnormalities in temperature distribution and the like were not observed, and quality of the produced glass fibers did not have any special problem.

INDUSTRIAL APPLICABILITY

The present inventive bushing for producing glass fibers enables stable operation of a device for producing glass over a long operation period, and thereby efficient production of good quality glass fibers.

What is claimed is:

1. A bushing for producing glass fibers, comprising: a plurality of nozzles made of platinum or a platinum alloy from which molten glass is discharged; and a base plate made of platinum or a platinum alloy, the plurality of nozzles being joined to the base plate, wherein a coating layer is formed in a belt shape on an outer circumferential face of a tip part on a side of glass discharge on each of the plurality of nozzles, and a width of the coating layer on each nozzle is 5% or more and 95% or less with respect to an entire length of each nozzle, the base plate includes, at least in a part thereof, a non-coating area not provided with the coating layer, and wherein a total coverage P of all the nozzle tip parts represented by the following equation is 5% or more and 350% or less:

$$P(\%) = C/(NC_1 + NC_2) \times 100 \qquad \text{[Expression 1]}$$

wherein C is a total surface area of the coating layer on the nozzle tip parts of all the nozzles, $NC_1$ is a total surface area of areas not provided with the coating layer on all the nozzles, and $NC_2$ is a surface area of the non-coating area on the base plate.

2. The bushing for producing glass fibers according to claim 1, wherein a thickness of the coating layer is in a range of 2 μm or more and 500 μm or less.

3. The bushing for producing glass fibers according to claim 2, wherein the coating layer is made of at least one of zirconia, stabilized zirconia, alumina, silica, aluminosilicate, and magnesia.

4. The bushing for producing glass fibers according to claim 1, wherein the coating layer is made of at least one of zirconia, stabilized zirconia, alumina, silica, aluminosilicate, and magnesia.

\* \* \* \* \*